W. P. POWERS.
GAS SUPPLY REGULATOR FOR GAS HEATERS.
APPLICATION FILED JULY 22, 1918.

1,305,742.

Patented June 3, 1919.
2 SHEETS—SHEET 1.

Inventor:
William P. Powers,
by Hazard & Miller
Att'ys.

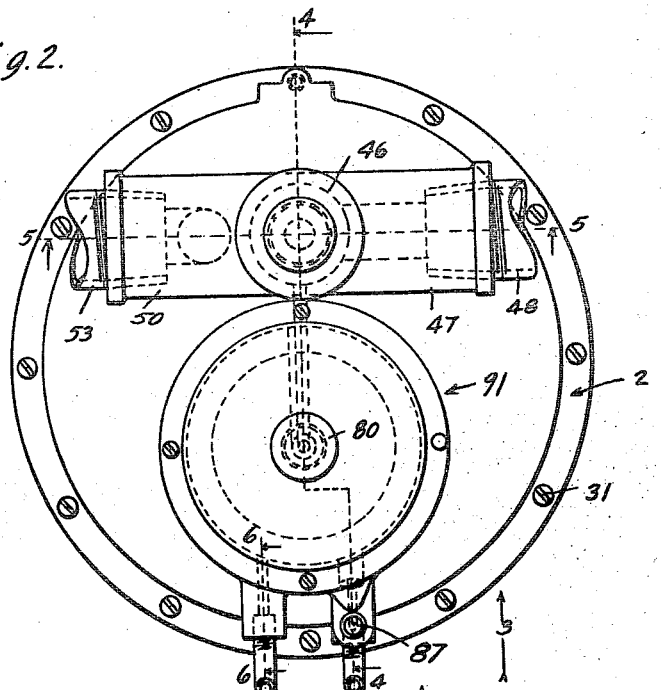

UNITED STATES PATENT OFFICE.

WILLIAM P. POWERS, OF LOS ANGELES, CALIFORNIA.

GAS-SUPPLY REGULATOR FOR GAS-HEATERS.

1,305,742.

Specification of Letters Patent.  Patented June 3, 1919.

Application filed July 22, 1918. Serial No. 246,199.

*To all whom it may concern:*

Be it known that I, WILLIAM P. POWERS, a citizen of the United States, residing at Los Angeles, in the county of Los Angeles and State of California, have invented new and useful Improvements in Gas-Supply Regulators for Gas-Heaters, of which the following is a specification.

My invention relates to a combustible gas regulating device and particularly to novel apparatus in which the gas is employed as the motive fluid for operating the regulating and controlling apparatus.

One of the principal objects of my invention is to provide a simple and relatively inexpensive apparatus adapted for installation in residences, in which gas is employed for heating, the device including the necessary thermostatically controlled regulating apparatus and a safety shut-off adapted to automatically act upon failure of supply pressure to prevent the passage of any gas beyond the regulating apparatus until manually actuated. I am aware that shut-off devices by means of which the desired result is secured are not new but I believe it novel to provide in a unitary structure, the necessary coöperating elements for securing the combined result of thermostatically controlling the supply of gas to the burner and shutting off the gas in the specified emergency.

Another important feature of the invention is the provision of means whereby the supply pressure of the gas is utilized as the motive fluid for operating the controlling apparatus. It has heretofore been common to employ a source of power such as compressed air for operating the controlling apparatus through the medium of a thermostat and this system may be found to be desirable in large installations or in establishments where a source of compressed air is available. However, in the use of a device of this character for small installations, such as residences, a source of compressed air is not readily available and cannot be procured without providing relatively expensive apparatus, which in its operation requires more or less attention. The object of this improvement is to provide apparatus which is actuated solely by the gas pressure, the thermostat serving to control the pressure on the valve operating diaphragm. Thus no supplemental source of power is necessary and the unitary apparatus may be installed and maintained in operation without attention from the user.

Other advantages will be apparent from the following description. The invention will be more readily understood by reference to the accompanying drawings in which—

Figure 1 is a perspective showing a gas burner supplied with gas through a diaphragm regulator controlled by a thermostat later described embodying the principles of my invention;

Fig. 2 is an enlarged horizontal section on the line 2—2 of Fig. 1 and looking downwardly, and as seen looking in the direction indicated by the arrows 2 in Figs. 3 and 4.

Fig. 3 is a fragmentary side elevation on a plane parallel with Fig. 1 and looking in the direction indicated by the arrows 3 in Figs. 2 and 4.

Fig. 6 is a fragmentary sectional detail on the lines 6—6 of Figs. 2 and 3.

Fig. 7 is a sectional view showing the internal construction of the thermostatic valve.

Figure 1:
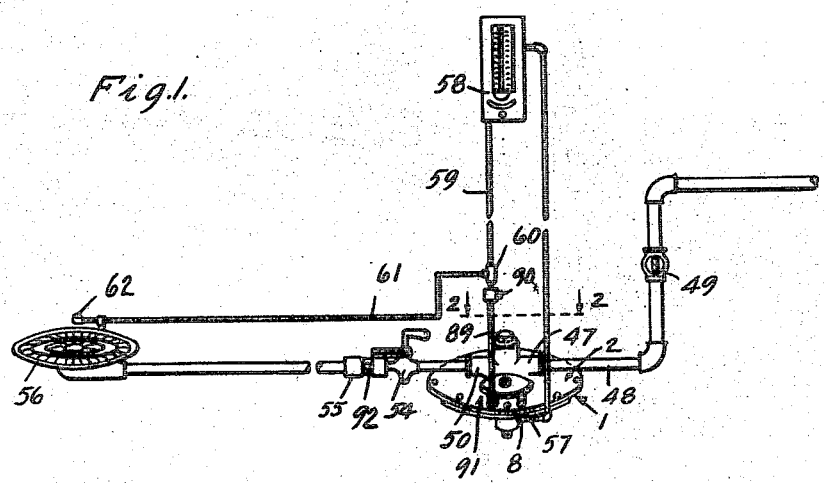
Figure 4:
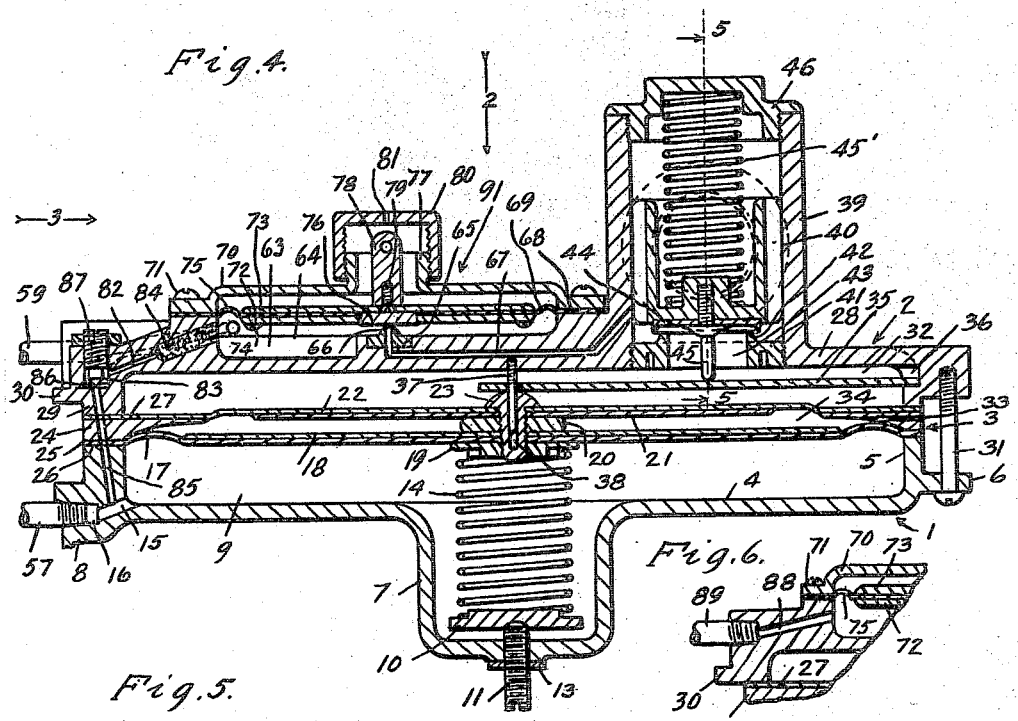
Fig. 4 is a vertical sectional detail on the lines 4—4 of Figs. 2 and 3.
Figure 5:
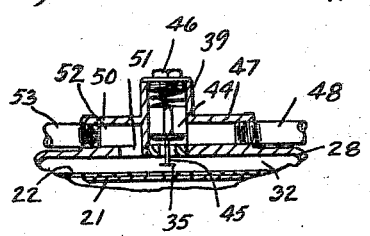
Fig. 5 is a fragmentary vertical cross-section on the lines 5—5 of Figs. 2 and 4.

The main body of the regulator consists of the lower member 1, the upper member 2, and the intermediate member 3.

The lower member 1 comprises a flat circular plate 4, an annular casing flange 5 extending from the periphery of the plate 4, the annular attaching flange 6 extending outwardly from the casing flange 5, the spring casing 7 extending downwardly from the center of the plate 4, and the pipe nipple 8 extending outwardly in line with the edge of the plate 4. A chamber 9 is formed within the spring casing 7 and above the plate 4 within the flange 5, a spring seat 10 is mounted loosely in the bottom of the spring casing 7; said spring seat being a flat circular plate; an adjusting screw 11 is screw-seated upwardly through the bottom of the casing 7 against the spring seat 10, and a lock-nut 13 is placed upon the adjusting screw. An expansive coil spring 14 is mounted upon the spring seat 10. A passage 15 leads from the chamber 9 to the bore 16 in the nipple 8. The upper edge of the casing flange 5 is finished and a diaphragm 17 preferably of leather is placed against this finished edge to cover the chamber 9. A reinforcing plate 18 is placed upon the diaphragm to stiffen its central portion. A spring seat 19 is secured to the lower face of the diaphragm 17 in position to engage the upper end of the spring 14. A spacing washer 20, preferably of leather, is placed on top of the diaphragm 17 in opposition to the spring seat 19, a plate 21 is placed against the washer, a diaphragm 22, preferably of leather, is placed against the plate, and a screw 23 is inserted downwardly through the diaphragm 22, the plate 21, the plate 18, and the diaphragm 17, and screwed into the spring seat 19.

The intermediate member 3 is an annular ring 24 having a lower face 25 fitting the diaphragm 17 in opposition to the face 26 of the casing flange 5, and has an upper face 27 extending inwardly under the diaphragm 22 a considerable distance beyond the inner face of the casing so as to reduce the effective area of the diaphragm 22 relative to the effective area of the diaphragm 17. In other words, the piston surface of the diaphragm 22 is considerably smaller than the piston surface of the diaphragm 17, for purposes hereafter described.

The upper member 2 includes the circular flat plate 28 having an annular casing flange 29 fitting against the diaphragm 22 in opposition to the casing flange 5, and an annular attaching flange 30 extending outwardly from the casing flange 29 and mating the attaching flange 6. Cap screws 31 are inserted through the flange 6 and tapped into the flange 30 to hold the three parts together. A chamber 32 is formed within the casing flange 29 between the diaphragm 22 and the face of the plate 28.

A vent 33 is formed through the member 3 to permit atmospheric pressure to be maintained in the chamber 34 between the diaphragms 17 and 22.

A lever 35 is mounted with one end resting upon the head of the screw 23 and the other end extending into a recess 36, said recess extending from the chamber 32 into the casing flange 29 so as to mount the lever 35 substantially parallel with the diaphragm 22. A pin 37 is tapped into the plate 28 and extends through the lever 35 into a bore 38 drilled downwardly into the screw 23 to hold the lever 35 in place.

A valve casing 39 is formed integral with the plate 28 and has a vertical bore 40 extending from the chamber 32 to the top. A valve seat member 41 is screwed up into the bore 40 and carries a valve seat 42 and has a passage 43 leading through the valve seat. A valve 44 is slidingly mounted in the bore 40 to engage the valve seat 42 and a pin 45 extends downwardly from the center of the valve through the passage 43 to engage the lever 35. An expansive coil spring 45' is mounted upon the valve 44 and a cap 46 is screwed into the chamber 40 against the spring 45', the tension of the spring being exerted to hold the valve firmly seated. A nipple 47 extends horizontally from the valve casing 39 and the supply pipe 48 is tapped into this nipple. A nipple 50 extends from the opposite side of the valve casing 39 from the nipple 47. A passage 51 leads upwardly from the chamber 32 through the plate 28 to the bore 52 in the nipple 50 and the feed pipe 53 is tapped into the nipple 50. A valve 54 may be placed in the feed pipe 53, leading to the air mixer 55 which is connected to the main burner 56.

A pipe 57 is tapped into the nipple 8 and extends outwardly and upwardly to the thermostat 58 which in a residence is usually located in a central part of the house. A pipe 59 extends downwardly from the thermostat 58 to a T 60 and a pipe 61 leads from the T 60 to the pilot burner 62, the object being to carry to and consume in the furnace the gas which passes through the thermostat.

A circular recess 63 is formed in the upper face of the plate 28 and a rib 64 extends diametrically to the center along the bottom of the recess 63. A finished plate 65 is embedded downwardly into the rib 64 at the center of the recess 63 and has a nozzle 66 projecting and discharging upwardly. A passage 67 leads from the chamber 40 in the valve casing 39 through the rib 64 and plate 28 to the nozzle 66. The upper face 68 of the plate 28 around the recess 63 is finished, a diaphragm 69, preferably of leather, is fitted to this face to cover the recess 63, and a cap plate 70 fits upon the diaphragm in opposition to the face 68 and is secured in place by cap screws 71. A plate 72 is placed upwardly against the diaphragm 69, a second plate 73 is placed downwardly upon the diaphragm, and the plates are secured together by screws 74. The plates 72 and 73 are considerably smaller than the recess 63 so as to leave an annular portion 75 of the diaphragm 69 free. A leather seat 76 is secured to the center and lower face of the plate 72 to engage the end face of the nozzle 66 when the diaphragm is at rest with no pressure under it. A hollow nipple 77 extends upwardly at the center of the cap plate 70, a handle 78 is secured to the plate 73 by a screw 79, and said handle extends upwardly through the hollow in the nipple 77, affording means for manually lifting the diaphragm 69 to the attached valve seat 76. A cap 80 is removably screw-seated upon the nipple 77 to cover the handle 78, and a vent 81 is formed through the cap 80.

A port 82 extends from the recess 63 to a port 83, the inner end of the port 82 being enlarged to receive a porous filter packing 84. The port 85 extends from the port 83 through the casing flange 29, through the ring 24 and through the casing flange 5 to the passage 15. A valve seat 86 is formed at the upper end of the passage 85 and a needle valve 87 is screw-seated in the bore 83 to operate against the valve seat 86, so that by manipulating the needle valve 87 the passage of gas from the recess 63 to the chamber 9 may be finely adjusted. A passage 88 leads from the recess 63 through the plate 28 and a pipe 89 is screwed into the outer end of this passage and connected to the lower end of the T 60, there being a valve 90 in the pipe for the purpose of controlling the supply of gas to the pilot light.

The thermostatic valve indicated generally by the numeral 58 in Fig. 1, comprises, as best shown in Fig. 7, a valve 58$^a$ normally held against its seat by a spring 58$^b$, this valve controlling the passage of gas from the conduit 57 to the conduit 59. A thermostatic element 59$^e$ in the form of a hollow resilient disk is adapted to contain a volatile liquid which expands or vaporizes on the application of heat. The degree of expansion is controlled by a spring 58$^d$ and an adjusting screw. It is apparent that upon an increase of heat in the apartment in which the thermostat is located, the thermostatic element will expand and cause the opening of the valve 58$^a$, thus permitting the escape of pressure from the chamber 9 and the subsequent closing of the main valve.

Having described the mechanical construction, the operation is as follows:

When the temperature at the thermostat is at or above the degree to which it is adjusted the valve in it is held open permitting a free passage through it from chamber 9 to the pilot in the furnace.

The gas pressure coming through the supply pipe 48 enters the chamber 40 above the valve 44, and the tension of the spring 45' and the weight of the various parts operate normally to hold the valve 44 to its seat. The gas from the chamber 40 will pass through the passage 67 to the nozzle 66. The weight of the plates 72 and 73 and the handle 78 will hold the seat 76 against the nozzle 66 and prevent the initial passage of the gas. The pressure from the chamber 9 has escaped through the pipe 57, through the thermostat 58, the pipe 59, the T 60 and the pipe 61 to the pilot light 62. In this way the burner 56 is shut off from the gas pressure even though the valve 54 may be open. Now, supposing that the gas has been shut off and again turned on and it is desired to start the burners, the temperature at the thermostat being below the degree to which it is adjusted. The cap 80 is removed, and the handle 78 manipulated to raise the seat 76 from the nozzle 66, thereby allowing the gas to pass into the recess 63 under the diaphragm 69 where it operates to hold the diaphragm in a raised position. Then the gas passes from the recess 63 through the filter packing 84, the passage 82, the valve seat 86, the passage 85, the passage 15, to the chamber 9. The accumulating pressure on the diaphragm 17 in the chamber 9 will raise the two diaphragms, raise the inner end of the lever 35, raise the pin 45 resting upon the center of the lever, and unseat the valve 44, thereby admitting the gas through the passage 43 to the chamber 32.

It will be seen that the gas pressure in chamber 32 acts in opposition to the gas pressure in chamber 9.

The weight of the two diaphragms and the plates 18 and 21 together with that of the main valve and the force exerted by the spring 45 also act to oppose the pressure of the gas in chamber 9. The gas pressure in chamber 32 coöperating with these forces allows the main valve 44 to close when these combined forces balance the pressure in chamber 9. It is evident that if both diaphragms 17 and 22 were of equal area or if only a single diaphragm were employed the pressure in chamber 32 would be less than that in chamber 9 by reason of the action of the coöperating forces above named which assist the pressure in chamber 32 in the closing of the main valve 44. Hence, the necessity of the differential diaphragm if the maximum pressure of the gas is to be maintained when needed in the burner. Gas regulators employing a diaphragm for opening or closing the supply valve have been heretofore employed but the combination of elements shown herein by which a new and useful result is secured, is thought to be patentable.

It will be evident that as the opening of the valve 58$^a$ in the thermostat is gradual upon a rising temperature the pressure in chamber 9 will be graduated in accordance with the amount of discharge permitted by the thermostat valve as compared with the amount of gas supplied through the valve 87. This variable pressure proportionate to the temperature at the thermostat will cause a like variable pressure of the gas in chamber 32 and consequently, in the burner. The gas escaping from chamber 9 through the thermostat may be led into the pipe supplying the pilot 62.

The pilot has a constant and independent supply of gas taken from chamber 63 through the controlling valve 90 and serves to ignite the gas when supplied to the burner.

The diaphragm 69 with the coöperating parts forms a self-closing safety valve 91. The pressure in the recess 63 under the safety valve diaphragm 69 will hold the valve open as long as the pressure from the supply pipe is maintained, and when, for any reason, the pressure from the supply pipe is interrupted sufficiently to extinguish the pilot light 62 and the main burner 56, then the safety valve will close by the weight of the diaphragm and plate. The parts will remain in this position notwithstanding the subsequent restoration of the pressure in the supply line until the diaphragm 69 and its associated parts are manually raised to permit the pressure to act against the diaphragm.

I am aware that it is not new to automatically close directly the main supply valve upon a failure of the gas pressure. What I claim as new is the arrangement of mechanism by which the energizing force necessary to cause the opening of the main valve is withheld through the action of correlated appliances in combination with the main supply valve.

When the burner and furnace house is cold the action of the regulator will open the regulating valve 44 to supply the burner 56 to its full capacity. The opening in nozzle 92 is of sufficient size to supply gas to the full capacity of the burner 56 and the burner will run at full capacity, until the temperature of the room rises sufficiently to operate the thermostat 58, and thereafter the gas in burner 56 will be controlled by the thermostat and regulator at such pressure as will maintain the desired temperature, this pressure ranging from the maximum to zero.

It is sometimes desired to operate under minimum amount of pressure and not allow the gas to be entirely shut off. This operation is secured by turning in the screw 11 compressing the spring 14 until it partially supports the diaphragm in the absence of pressure in chamber 9.

It is not essential that the return pipe from the thermostat be connected with the pilot supply—nor is it necessary that the pilot supply be taken from chamber 29. It is however preferable as it affords an escape for any slight leakage that may occur in valve formed by nozzle 66 and closure 76. It may have an independent supply or the pilot may be dispensed with altogether as when sufficient tension is maintained in the spring 14 to support the operating diaphragm permitting a minimum flame in the burner.

Various changes may be made in the details of construction without departing from the spirit of my invention as claimed.

I claim:

1. In a gas controlling device, the combination of a casing, a main valve, a gas controlled diaphragm in said casing for adjusting the position of said valve, said casing providing a chamber at one side of said diaphragm, a thermostat for controlling the pressure of gas in said chamber which is exerted on said diaphragm, said casing providing a passage for gas to said chamber, and an automatic valve located in said passage, said valve being adapted to prevent the subsequent opening of the main valve by the thermostat and diaphragm, following a failure and restoration of the supply of gas, until manually actuated, substantially as described.

2. In a gas controlling device, the combination of a casing, a main valve, a gas supply conduit connected to one side of said valve, a discharge conduit connected to the other side of said valve, means tending normally to seat said valve, a diaphragm in said casing, the casing providing chambers on opposite sides of the diaphragm, the chamber at one side of said diaphragm being in communication with said discharge conduit, whereby pressure in said chamber on said diaphragm tends to permit said valve seating means to close the valve, means providing a communicating passage between the gas supply conduit and the chamber on the opposite side of the diaphragm, a thermostat for controlling the pressure of gas in the last named chamber, and an automatic valve in said passage adapted to prevent the subsequent opening of the main valve by the action of the thermostat and diaphragm following a failure and restoration of the supply of gas, until manually actuated, substantially as described.

3. In a gas controlling device, the combination of a casing, a main valve, a gas supply conduit connected to one side of said valve, a discharge conduit connected to the other side of said valve, means tending normally to seat said valve, a diaphragm in said casing, the casing providing chambers on opposite sides of the diaphragm, the diaphragm having different effective areas on its opposite sides, the chamber on the side of the lesser area being in communication with the discharge conduit, a conduit connecting the chamber on the side of greatest area with the gas supply conduit, a thermostat for controlling the pressure of gas in the chamber on the side of greatest area of the diaphragm, a safety valve in said connecting conduit, said safety valve being adapted to operate on failure of supply pressure of gas to prevent the subsequent passage of gas to the chamber on the side of greatest area of the diaphragm upon restoration of said supply pressure, until manually actuated, substantially as described.

4. In a unitary gas controlling and safety device, the combination of a casing, a main valve, one side of which is adapted to be connected to a supply of gas and the other side of which is adapted to be connected to a burner, said valve serving to control the passage of gas to the burner, a diaphragm in said casing for actuating said valve, said casing providing a chamber on one side of said diaphragm, said casing providing an outlet from the chamber, a thermostat for controlling the passage of gas through said outlet, a conduit providing a connection between the gas supply and the last named chamber, whereby the gas and supply pressure tends to open said valve, a safety valve in said conduit, said safety valve being adapted to prevent the passage of any gas to the chamber subsequent to the interruption of the supply of gas, until manually actuated, substantially as described.

5. A self-contained, controlling and safety device, comprising in combination a casing, a main valve therein, a diaphragm within said casing, the casing providing a chamber on one side of said diaphragm, a conduit connecting the gas supply with said chamber, means in said conduit for restricting the passage of gas therethrough, a thermostat acting to control the escape of gas from said chamber, and a safety valve also located in said conduit and adapted to close the same upon failure of pressure of gas and prevent the passage of gas to the diaphragm chamber upon a restoration of the supply of gas, substantially as described.

6. In a gas controlling device, the combination of a casing, a main valve in said casing, one side of the valve being adapted to be placed in communication with a supply of gas, the other side of said main valve being adapted to be placed in communication with a burner, means tending to hold said valve on its seat, a pair of diaphragms in said casing, said casing providing a chamber at the side of each diaphragm, said diaphragms having different effective areas, means placing the chamber at the side of the diaphragm of lesser area in communication with the burner side of the main valve, means connecting the chamber at the side of the diaphragm of greatest area with the supply side of the main valve, a thermostat for controlling the pressure of gas in said last named chamber whereby said last named chamber is under varying pressures, and a safety shut-off in the connecting means for gas from the supply side of the burner to the chamber on the side of the diaphragm of greatest area, substantially as described.

7. In a device of the class described, the combination of a casing, a main valve, a gas supply conduit connected to one side of said valve, a conduit connected to the other side of the valve and adapted to be placed in communication with a burner, means tending normally to seat said valve, a pair of diaphragms of different effective areas mounted in said casing, said casing providing chambers adjacent said diaphragms, the first diaphragm being of less effective area than the second diaphragm, the chamber adjacent the first diaphragm being in communication with the conduit which is adapted to be connected to a burner, a conduit connecting the chamber adjacent to the second diaphragm with the conduit on the supply side of the main valve, a restricting needle valve located in the conduit connecting the chamber adjacent to the second diaphragm with the gas supply conduit, a thermostat for controlling the escape of pressure from the chamber adjacent the second diaphragm, and a safety shut-off valve also located in the conduit connecting the second diaphragm chamber with the gas supply conduit, substantially as described.

8. In a device of the class described, the combination of a casing, a main valve, a gas supply conduit at one side thereof and a gas discharge conduit at the other side thereof, a spring tending to close the main valve, a diaphragm in said casing tending to open said valve, said casing providing a chamber adjacent to said diaphragm, a conduit connecting the said chamber to the gas supply conduit, a pilot light connected in the conduit connecting the chamber to the gas supply, a thermostat for controlling the escape of gas from said chamber, and an automatic valve in the conduit connecting the chamber to the gas supply, said valve being adapted to close upon failure of gas pressure and to prevent the subsequent passage of any gas to the valve opening diaphragm or to the pilot light until manually opened, substantially as described.

9. In a device of the class described, the combination of a casing provided with a gas inlet and a gas outlet, a main valve located in the casing, a spring tending to maintain the main valve in closed position, the casing being provided with a chamber adjacent to said main valve, a pair of diaphragms dividing said chamber, an annular flange projecting into the chamber between said diaphragms, said flange serving to restrict the effective area of the first diaphragm with relation to pressure thereabove, a conduit for placing the chamber adjacent to the second diaphragm in communication with the gas inlet, a restricting valve in said conduit, and a thermostat for controlling the escape of gas from the chamber adjacent said second diaphragm, substantially as described.

10. In a device of the class described, the combination of a casing provided with a gas inlet and gas outlet, a main valve located in the casing, a spring tending to maintain the main valve in closed position, the casing being provided with a chamber adjacent to said main valve, a pair of diaphragms dividing said chambers, an annular flange projecting into the chamber between said diaphragms, said flange serving to restrict the effective area of the first diaphragm with relation to pressure thereabove, a conduit for placing the chamber adjacent to the second diaphragm in communication with the gas inlet, a restricting valve in said conduit, a thermostat for controlling the escape of gas from the chamber adjacent said second diaphragm, and an automatic valve also located in said conduit, said valve having the function of preventing passage of gas to the chamber at the side of the second diaphragm following a failure and restoration of supply of gas, until manually actuated, substantially as described.

11. In a device of the class described, the combination of a casing provided with a gas inlet and gas outlet, a main valve located in the casing, a spring tending to maintain the main valve in closed position, the casing being provided with a chamber adjacent to said main valve, a pair of diaphragms dividing said chamber, an annular flange projecting into the chamber between said diaphragms, said flange serving to restrict the effective area of the first diaphragm with relation to pressure thereabove, a conduit for placing the chamber adjacent to the second diaphragm in communication with the gas inlet, a restricting valve in said conduit, a thermostat for controlling the escape of gas from the chamber adjacent said second diaphragm, a pilot light, a tube for supplying gas to the same, said tube being connected to said conduit, and an automatic valve also located in said conduit and adapted to interrupt the passage of gas to the pilot light and to the chamber adjacent said second diaphragm upon failure of gas supply, substantially as described.

In testimony whereof I have signed my name to this specification.

WILLIAM P. POWERS.